(12) United States Patent
Sanouillet et al.

(10) Patent No.: US 10,241,685 B2
(45) Date of Patent: Mar. 26, 2019

(54) EXTERNALLY MANAGED I/O STARVATION AVOIDANCE IN A COMPUTING DEVICE

(71) Applicant: Oracle International Corporation, Redwood City, CA (US)

(72) Inventors: Blaise Sanouillet, Rickmansworth (GB); Roch Bourbonnais, Corenc (FR); Peter Weston Gill, Boulder, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 99 days.

(21) Appl. No.: 15/239,396

(22) Filed: Aug. 17, 2016

(65) Prior Publication Data

US 2018/0052612 A1     Feb. 22, 2018

(51) Int. Cl.
   *G06F 3/06* (2006.01)

(52) U.S. Cl.
   CPC ............ *G06F 3/0611* (2013.01); *G06F 3/061* (2013.01); *G06F 3/067* (2013.01); *G06F 3/0659* (2013.01); *G06F 3/0683* (2013.01)

(58) Field of Classification Search
   CPC ..... G06F 3/0611; G06F 3/0659; G06F 3/0683
   USPC .......................................................... 710/52
   See application file for complete search history.

(56) References Cited

U.S. PATENT DOCUMENTS

| | | | | |
|---|---|---|---|---|
| 5,530,897 A * | 6/1996 | Meritt | ................... | G06F 13/122 340/2.4 |
| 5,701,473 A * | 12/1997 | Braseth | ............. | G06F 17/30339 707/823 |
| 7,047,322 B1 * | 5/2006 | Bauman | ............... | G06F 12/0835 710/33 |
| 7,739,470 B1 * | 6/2010 | Norgren | ............... | G06F 11/3485 709/224 |
| 7,757,013 B1 * | 7/2010 | Lawson | ............... | G06F 11/3409 710/15 |

(Continued)

FOREIGN PATENT DOCUMENTS

| | | |
|---|---|---|
| WO | 2009121797 | 10/2009 |
| WO | 2018034720 | 2/2018 |

OTHER PUBLICATIONS

International Application No. PCT/US2017/036282, International Search Report and Written Opinion dated Sep. 6, 2017, 15 pages.

*Primary Examiner* — Paul R. Myers
(74) *Attorney, Agent, or Firm* — Kilpatrick Townsend & Stockton LLP (57) ABSTRACT

Implementations of the present disclosure involve a system and/or method for managing a storage system and, more particularly, for externally managing input/output (I/O) requests to a storage device to avoid large delays in servicing the I/O requests. The management system may maintain I/O request queues for one or more of the storage devices associated with the system. The system may calculate a difference between an order value of the I/O request at the top of the queue and the bottom of the queue for the storage devices. If the calculated difference is above a threshold value, new I/O requests for the storage device are not added to the queue or transmitted to the storage device. In this manner, the management system may force the storage device to service an I/O request that has been stored in the queue for some time without being serviced.

18 Claims, 7 Drawing Sheets

(56) References Cited

U.S. PATENT DOCUMENTS

| | | | | |
|---|---|---|---|---|
| 8,464,276 B1* | 6/2013 | Leonard | G06F 9/546 | 719/314 |
| 8,838,931 B1* | 9/2014 | Marshak | G06F 3/0605 | 710/74 |
| 9,231,879 B1* | 1/2016 | Wojcik | H04L 47/22 | |
| 9,645,747 B2* | 5/2017 | Candelaria | G06F 3/061 | |
| 9,934,172 B1* | 4/2018 | Koli | G06F 13/1642 | |
| 2003/0056038 A1* | 3/2003 | Cochran | G06F 3/0601 | 710/36 |
| 2003/0188119 A1* | 10/2003 | Lubbers | G06F 9/50 | 711/170 |
| 2003/0188218 A1* | 10/2003 | Lubbers | G06F 11/2058 | 714/5.11 |
| 2003/0204687 A1* | 10/2003 | Hyde, II | G06F 3/0601 | 711/158 |
| 2006/0064529 A1* | 3/2006 | Anand | G06F 13/24 | 710/260 |
| 2008/0114702 A1* | 5/2008 | Hawrysz | G06Q 40/00 | 705/36 R |
| 2009/0248917 A1* | 10/2009 | Kalos | G06F 3/061 | 710/39 |
| 2009/0259752 A1* | 10/2009 | McNutt | H04L 67/1097 | 709/225 |
| 2009/0265519 A1* | 10/2009 | Moore | G06F 1/3221 | 711/162 |
| 2010/0312883 A1* | 12/2010 | Winn | G06F 9/4881 | 709/224 |
| 2012/0017020 A1* | 1/2012 | Pruthi | G06F 12/0868 | 710/301 |
| 2012/0278513 A1* | 11/2012 | Prevost | G06F 9/5038 | 710/39 |
| 2014/0101256 A1* | 4/2014 | Craig | G06F 3/0611 | 709/206 |
| 2015/0012705 A1* | 1/2015 | Holmqvist | G06F 12/0842 | 711/118 |
| 2016/0063021 A1* | 3/2016 | Morgan | G06F 17/30097 | 707/747 |

* cited by examiner

EXTERNALLY MANAGED I/O STARVATION AVOIDANCE IN A COMPUTING DEVICE

FIELD OF THE DISCLOSURE

Aspects of the present invention relate to computing systems and, more particularly, aspects of the present invention involve a system and/or method to monitor and control input/output (I/O) requests provided to a storage device such that no one I/O request is pending for a significant amount of time.

BACKGROUND

The continuous expansion of the Internet, the expansion and sophistication of enterprise computing networks and systems, the proliferation of content stored and accessible over the Internet, and numerous other factors continue to drive the need for large sophisticated data storage systems. Consequently, as the demand for data storage continues to increase, larger and more sophisticated storage systems are being designed and deployed. Many large scale data storage systems utilize storage appliances that include arrays of storage media. Typically, these storage systems include a file system for storing and accessing files. In addition to storing system files (e.g., operating system files, device driver files, etc.), the file system provides storage and access of user data files. For a user to access a file, one or more input/output (I/O) requests are generated to retrieve data blocks associated with the file from the multiple storage devices associated with the storage system.

Oftentimes, storage devices used by the storage systems may only handle so many I/O requests. For example, storage devices may be limited to ten I/O requests, either by the device itself or by a management software for the storage system. Further, I/O requests may not be completed or serviced in the order that they are received. Rather, many storage devices attempt to maximize the efficiency of retrieving the data blocks by servicing I/O requests in an order that reduces the physical demand on the storage device. For example, the movement and current location of the disk head over the disk drive may be considered when servicing I/O requests to the storage device. As such, particular I/O requests may be delayed in their completion as the storage device retrieves the data blocks stored on the storage medium. This may result in significant delays or slowdowns in processing I/O requests that may negatively impact the performance of the storage system.

It is with these and other issues in mind that various aspects of the present disclosure were developed.

SUMMARY

One implementation of the present disclosure may take the form of a method for managing a storage pool. The method includes the operations of maintaining a queue of one or more input/output (I/O) requests intended for a storage device, wherein each of the I/O requests of the queue comprise an order value indicative of the order in which the I/O requests were received at a storage management system and calculating a difference between the a first order value associated with a first I/O request in the queue and a second order value associated with a second I/O request in the queue. In addition, the method may include the operations of comparing the calculated difference between the first order value and the second order value to a threshold value and transmitting at least one I/O request from the queue of the one or more I/O requests to the storage device when the calculated difference between the first order value and the second order value is less than or equal to the threshold value Another implementation of the present disclosure may take the form of one or more non-transitory tangible computer-readable storage media storing computer-executable instructions for performing a computer process on a machine. The computer process may include the operations of managing a queue of one or more input/output (I/O) requests intended for a storage device, wherein each of the I/O requests of the queue comprise an order value indicative of the order in which the I/O requests were received at a storage management system and determining a difference between the a first order value associated with a first I/O request in the queue and a second order value associated with a second I/O request in the queue, wherein the first I/O request was received at the storage management system before the second I/O request. The computer process may also include comparing the calculated difference between the first order value and the second order value to a threshold value and transmitting at least one I/O request from the queue of the one or more I/O requests to the storage device when the calculated difference between the first order value and the second order value is less than or equal to the threshold value.

DETAILED DESCRIPTION

Implementations of the present disclosure involve a system and/or method for managing a storage system and, more particularly, for externally managing input/output (I/O) requests to a storage device to avoid large delays in servicing the I/O requests. In one embodiment, the system and method may be management software, device, or a large storage system with multiple storage devices. The management method may maintain I/O request queues for one or more of the storage devices associated with the system. Each queue may include a value corresponding to the order in which the I/O request was provided to the storage device and I/O requests may be arranged within the queue by the order value. For example, the head of the queue may include the I/O request to the storage device with the smallest order value and the tail of the queue may include the I/O request with the highest order value. Further, the storage system management method may limit the total number of I/O requests entered into the queue based on a threshold value for concurrent I/O requests to the storage device. As I/O requests are serviced or completed by the storage device, the related I/O request in the associated queue may be removed from the queue.

In addition, the management system may prevent a significant delay in any one I/O request to a storage device. In one embodiment, the system may calculate a difference between the order value of the I/O request at the top of the queue and the order value of the I/O request at the bottom of the queue. If the calculated difference is above a threshold value, new I/O requests for the storage device are not added to the queue or transmitted to the storage device. In general, no additional I/O requests are added to the queue until the calculated difference falls below the threshold value. In this manner, the management system may force the storage device to service an I/O request that has been stored in the queue for some time without being serviced. Also, avoiding the starvation of the I/O request is controlled externally to the storage device by the management system. Thus, the management system may be more aggressive (i.e., may accept a shorter delay in servicing a request to the storage device) than the storage device itself in avoiding delays in the completion of the request by withholding new I/O requests to the device until the starved request is serviced.

Figure 1:
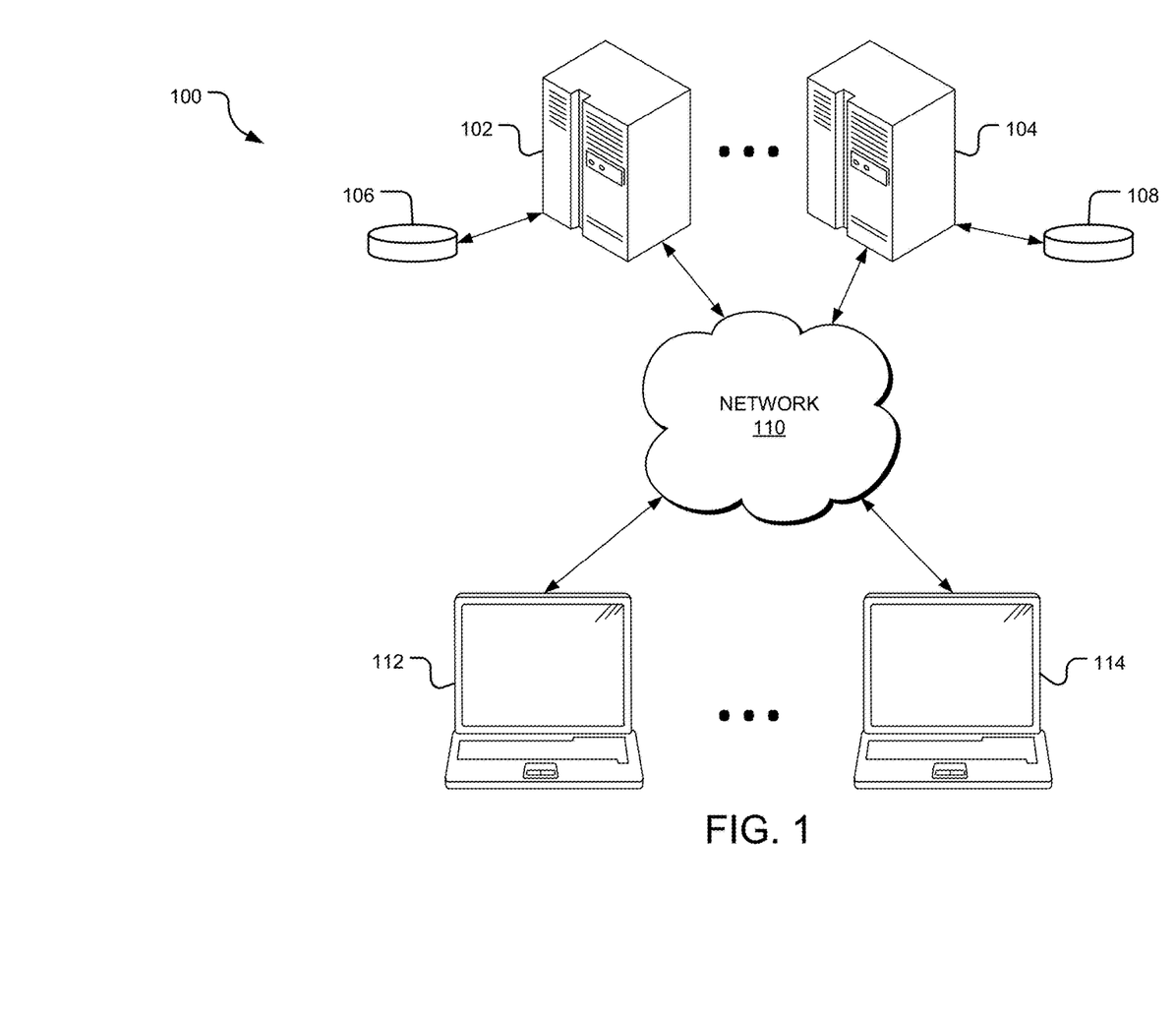
FIG. 1 is an example storage system configured to access data from one or more storage devices.

To begin a detailed description of an example storage system 100 configured to access data from one or more storage devices while maintaining one or more I/O request queues for the one or more storage devices to externally manage request starvation, reference is made to FIG. 1. As can be understood from FIG. 1, the example storage system 100 includes one or more storage devices 102-104, each managing the storage of data on storage media 106-108, which may involve spinning media (e.g., disk drives) as well as various forms of persistent memory, such as solid state memory. In one embodiment, the storage devices 102-104 may each store data in a hierarchical structure with data for which quick access is needed stored in faster storage media (e.g., one or more levels of cache memory) and other media stored in slower storage media, such as disk drives.

Although discussed herein with reference to a storage system with one or more storage devices 102-104, it should be appreciated that the systems, methods, and/or programs for externally managing I/O requests to a storage device may be utilized for any computing device that stores data in a storage device. For example, the systems and methods may be utilized in a computer that stores data in a memory component of the computer. Thus, in one example, the systems and methods are utilized by a computing device that stores data in a single memory device. In other examples, the systems and methods are utilized in systems that include several storage devices. In general, the systems may be used for any computing device that stores data in one or more storage devices that may reorganize received I/O requests. For simplicity, however, the systems and methods for externally managing I/O requests to storage devices is discussed herein in relation to a storage system, such as that illustrated in FIG. 1.

Returning to the example system 100 of FIG. 1, the storage devices 102-104 may each be, without limitation, a storage appliance, including a file-level storage server providing data access over a network 110 to one or more user devices 112-114 on a client network. Such a storage appliance may be, for example, a ZFS storage appliance, which is a combined file system and volume manager designed by Sun Microsystems® in 2005 and now expanded and advanced by Oracle® that allows for data integrity verification and repair, high storage capacities, along with numerous other features and advantages. Although discussed herein in the context of ZFS storage appliance, it will be appreciated that the storage devices 102-104 may each be any type of storage device with any type of storage appliance management software.

In one implementation, the storage devices 102-104 on a storage network may be accessible by the user devices 112-114 on the client network over the network 110. It will be appreciated, however, that the various networks may comprise an integrated network, and the connections discussed herein between the networks represent but one possible network topology. The various networks may also be local in nature or geographically dispersed, such as with large private enterprise networks or the Internet. The user devices 112-114 are generally any form of computing device capable of interacting with the network 110, such as a terminal, a workstation, a personal computer, a portable computer, a cellphone, a mobile device, a tablet, a multimedia console, and the like. In some implementations, the client network includes one or more user interfaces, including, for example, a business user interface (BUI), permitting a user to interact with a storage device to access data.

ZFS based systems utilize a storage pool layer having one or more storage pools (often referred to as "zpools") comprised of virtual devices (vdevs) constructed of block devices, such as the storage media 106-108. A block device is any device that moves data in the form of blocks, which may be, without limitation, hard disk drives, solid state drives, optical drives, magnetic drives, and other addressable regions of memory. A virtual device may span a number of block devices or volumes, and a storage pool may include one or more virtual devices, each including one or more partitions of storage media or one or more storage media.

Traffic to and from the storage devices 102-104 is typically managed by one or more dedicated storage servers located within the storage devices 102-104 or a storage network. A common protocol employed by storage appliances for accessing content, including files, directories, and their associated metadata is a Network File System (NFS). NFS is a widely used distributed file system protocol, originally developed by Sun Microsystems® in 1984 and currently in version 4 (NFSv4) from Oracle®. NFS allows the client network to access stored data seamlessly by providing a programming interface permitting the user devices 112-114 to: create and delete files; read and write files; perform seeks within a file; create and delete directories; manage directory contents; and perform other file, directory, or content operations. The operating system utilized by the user devices 112-114 is configured to communicate with the NFS programming interface to manage the file system and the interaction between executing applications with data residing in the storage devices 102-104. Generally, NFS systems manage file system metadata and provide access to files and directories. The metadata describes the location of the files and directories on the storage media 106-108.

Figure 2:
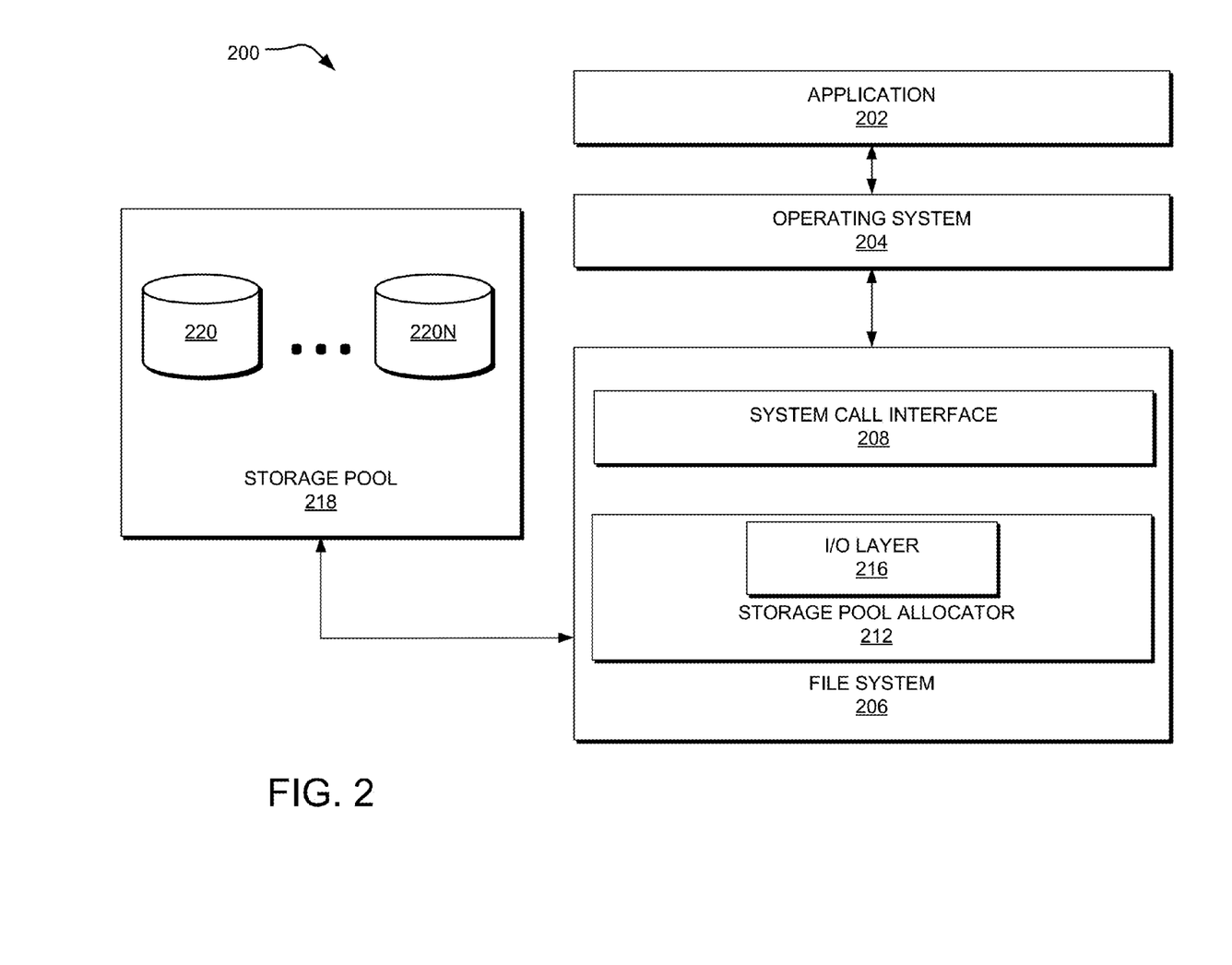
FIG. 2 is an example network file system implementing externally managed I/O request systems and methods.

Turning to FIG. 2, an example file system 200 implementing externally managed I/O requests systems and methods is shown. In one implementation, the system 200 includes an application 202 interfacing with an operating system 204. The operating system 204 includes functionality to interact with a file system 206, which in turn interfaces with a storage pool 218. The operating system 204 typically interfaces with the file system 206 via a system call interface 208. The operating system 204 provides operations for users to access files within the file system 206. These operations may include read, write, open, close, and/or the like. In one implementation, the file system 206 is an object-based file system (i.e., both data and metadata are stored as objects). More specifically, the file system 206 includes functionality to store both data and corresponding metadata in the storage pool 218.

In one implementation, the storage pool 218 comprises storage devices 220-220N. A storage device is any device that moves and stores data, which may be, without limitation, hard disk drives, solid state drives, optical drives, magnetic drives, and other addressable regions of memory. In general, the storage pool 218 includes one or more physical storage drives or disks as block devices 220-220N to store data transmitted to the storage pool from the file system 206.

In one implementation, operations provided by the operating system 204 correspond to operations on objects. Stated differently, a request to perform a particular operation (i.e., a transaction) is forwarded from the operating system 204, via the system call interface 208, to a data management unit (not shown). In one implementation, the DMU translates the request to perform an operation on an object directly to a request to perform a read operation (i.e., an I/O request) at a physical location within the storage pool 218. A storage pool allocator (SPA) 212 receives the request from the DMU and reads the blocks from the storage pool 218. In one implementation, the SPA 212 includes an I/O layer 216 and other modules, which may be used by the SPA 212 to read data from the storage pool 218. In one implementation, the I/O layer 216 receives I/O requests and groups the I/O requests into transaction groups for processing.

In one particular implementation, the file system 206 includes a program or other method to monitor and track each I/O request sent to the storage devices 220-220N of the storage pool 218. Thus, the methods and operations described herein may be performed by the file system 206 of FIG. 2. Such methods and operations may be performed through the execution of one or more software programs, through one or more hardware components, or through a combination of both software programs and hardware components. In other embodiments, however, the methods and operations may be performed by any computing device or component of the storage system through which I/O requests for data may be transmitted. For example, a second application may be executed by the operating system 204 to perform the herein described methods. In general, any computing device or component of a computing device may perform the operations and methods included herein.

As described above, operations provided by the operating system 204 are transmitted to the file system 206 to retrieve or store data on the storage devices 220-220N of the storage pool 218. These I/O requests are then transmitted by the file system 206 to the appropriate storage device 220-220N in the storage pool to store and/or retrieve data. Thus, the file system 206 manages each I/O request by knowing which storage device or devices 220-220N includes the requested data and providing the appropriate I/O request. Further, many storage devices 220-220N are limited in the number of I/O requests that the device can serve concurrently. For example, some storage devices 220-220N may only service ten I/O requests at one time before notifying the file system 206 that the I/O request queue for that device is full. Upon servicing or completing an I/O request, the storage device 220-220N may also provide some indication to the file system 206 of the completed request and an indication that another I/O request may be transmitted to the storage device. In this manner, the file system 206 (or other component of the storage system 200) acts as a gateway for I/O requests to the storage devices 220-220N of the storage pool 218.

As mentioned above, many storage devices 220-220N may employ mechanisms or procedures that delay fulfilling some I/O requests. For example, depending on the location of a disk head of a disk drive and the location of the requested data on the disk drive, some storage devices 220-220N will delay obtaining or storing data until the disk head is physically near the storage location on the disk. In some instances, this may significantly delay the response to the I/O request sent to the storage device 220-220N. Further, while some disk drives include procedures to fulfill delayed or "starved" I/O requests, such procedures may not occur for several seconds, depending on the type of storage device 220-220N. This delay in servicing an I/O request may negatively affect the performance of the storage system while the system waits for the servicing of the delayed request.

Figure 3:
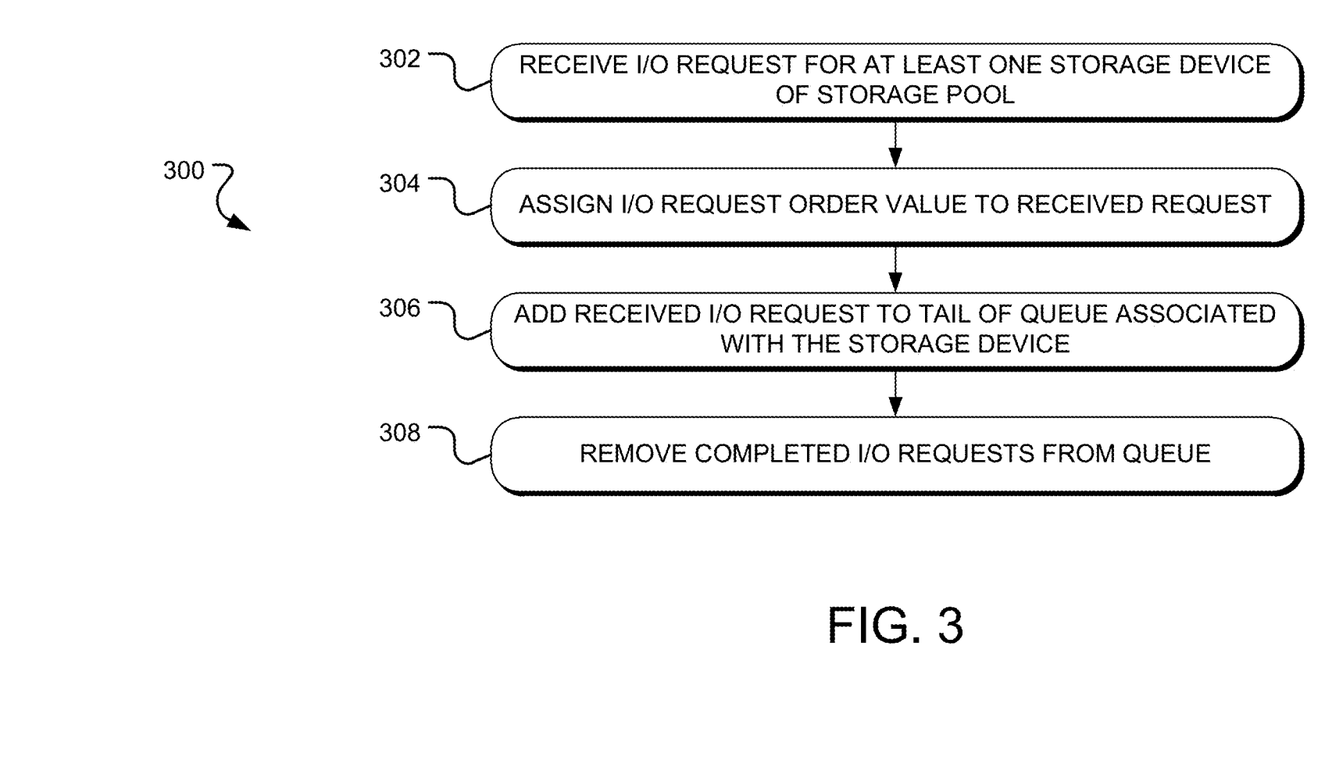
FIG. 3 is a flowchart for a method for managing a queue for a storage device of a storage system.
Figure 4:
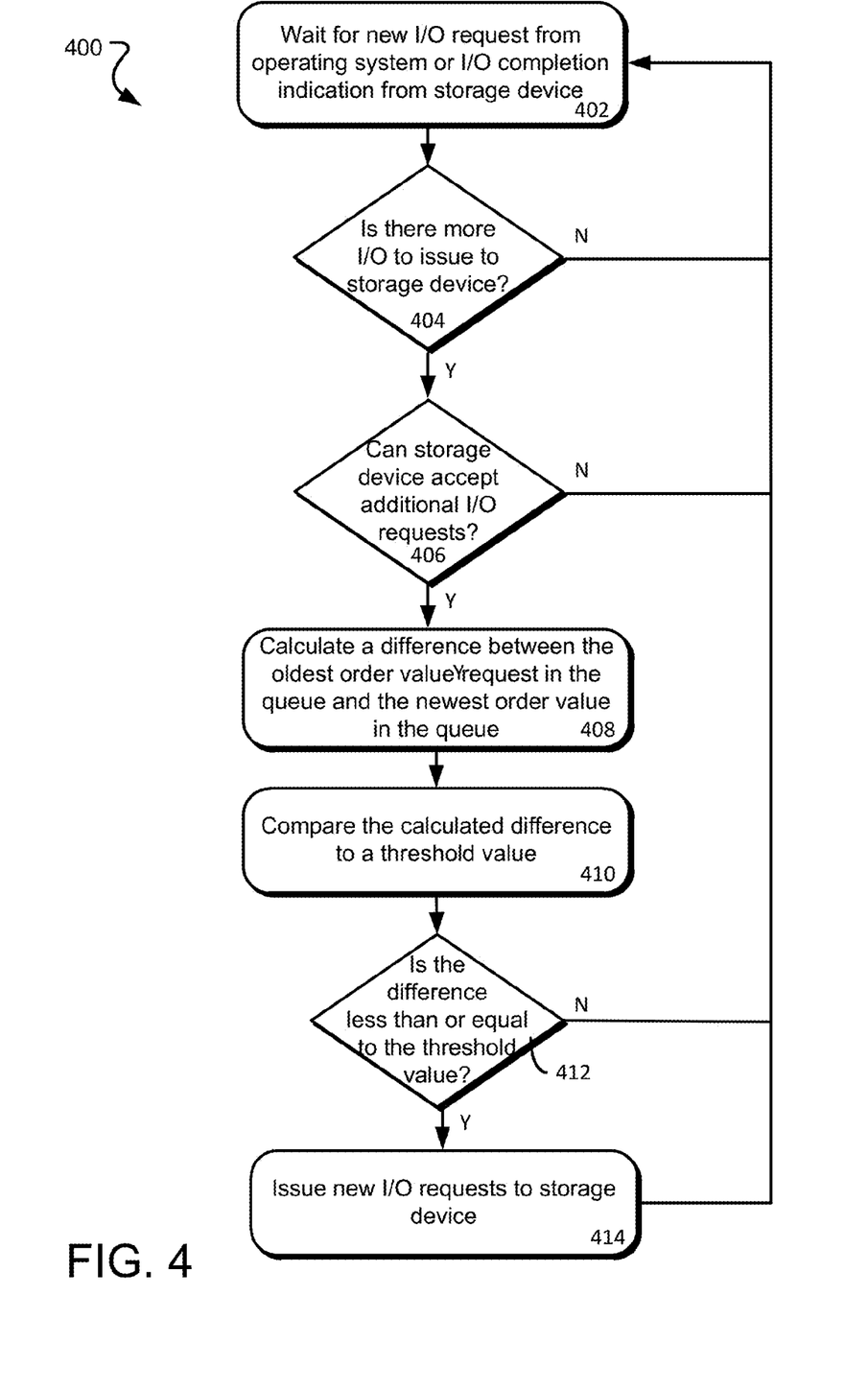
FIG. 4 is a flowchart for a method for externally managing I/O requests for a storage device of a storage system to prevent starvation of I/O requests.

To address this delay in servicing an I/O request, the storage system 200 may perform an externally managed I/O request starvation process to ensure that requests sent to a storage device 220-220N do not lay unfulfilled for too long. In particular, FIG. 3 is a flowchart for a method for managing a queue for a storage device of a storage system to prevent starvation of I/O requests. In addition to managing a queue for one or more storage devices 220-220N of the storage pool 218, FIG. 4 is a flowchart for a method for externally managing I/O requests for a storage device of a storage system to prevent starvation of I/O requests. Through the execution of the methods described, the file system 206 may externally manage the I/O requests sent to the one or more storage devices 220-220N of the storage pool 218 such that no one request is delayed in being serviced for too long as determined by the storage system 200.

The method 300 of FIG. 3 begins when the file system 206 receives an I/O request for a particular storage device 220 of the associated storage pool 218 in operation 302. The I/O request may be for reading data or writing data to the storage pool 218 and may be received from the operating system 204 of the storage system 200. In operation 304, the file system 206 assigns an I/O order value to the received I/O request for the particular storage device 220. For example, the file system 206 may maintain an ordered list of every I/O request for each of the storage devices 220-220N of the storage pool 218. In one embodiment, these ordered lists include a value in which the I/O for each device is received. Thus, a first I/O request for a particular storage device 220 is given an ordered value of "1", the second I/O request for that device is given an ordered value of "2", and so on. In one particular embodiment, the ordered value associated with an I/O request to a particular storage device is a 64-bit binary number. The file system 206 maintains the ordered list of I/O requests for each storage device 220-220N in the storage pool 218, incrementing the ordered value associated with the received I/O request for the storage devices 220-220N as the I/O requests are received. In one particular embodiment, the ordered values of the I/O requests may restart at "1" when the storage system 200 restarts or power cycles.

In another embodiment, the value associated with every I/O request in the ordered list may be based on an order in which the I/O request is to be satisfied or serviced. For example, the file system 206 in this embodiment reorders received I/O requests based on an order in which the file system determines the I/O requests are to be serviced. Further, the order value assigned to each I/O request in the ordered list may be assigned when the I/O from the head of the queue is issued to the I/O device. In this manner, more I/O requests may be added to the queue without having to add such requests to the tail of the queue. However, for simplicity in describing the present disclosure, the embodiment in which the I/O requests are added to the tail end of the queue and assigned an ordered value based on order in which the request is received is used.

Also, In addition to associating an order value to each received I/O request, the file system 206 may also maintain an I/O request queue for each storage device 220-220N in the storage pool 218. In one particular embodiment, the file system 206 may store the I/O request queues managed by the file system in one or more memory devices. Further, the file system 206 may execute one or more instructions to store the queues in the one or more memory devices. The request queue is an ordered list of I/O requests for a particular storage device 220-220N of the storage pool 218. In particular, the queue for a storage device may include the oldest I/O request (i.e., the I/O request for that storage device with the lowest order value) at the head of the queue and the newest I/O request (i.e., the I/O request for that storage device with the highest order value) at the tail of the queue. Such a queue may be maintained for each storage device 220-220N of the storage pool 218. In addition, the file system 206 may maintain a list or indication of which I/O requests have been sent to the respective storage device 220 and which I/O requests in the queue that have not been sent. As mentioned above, some storage devices 220 may limit the number of pending I/O requests at the storage device. Thus, the file system 206 may track the number of pending I/O requests at a particular storage device to ensure the number does not exceed the limit set by the storage device. To aid the file system 206, one or more of the storage devices 220-220N of the storage pool 218 may transmit available indicators or signals to the file system to indicate when the storage device can accept additional I/O requests of the storage device.

Returning to the method 300 of FIG. 3, the file system 206 may add the received I/O request to the appropriate queue associated with the storage device 220 of the request in operation 306. Further, because the received I/O request has the highest order value of the queue, the request is added to the queue at the tail of the queue. In operation 308, the file system 206 may remove serviced or completed I/O requests from the associated queue when an indication of the completion of the request is received from the associated storage device. In this manner, new I/O requests are added to the queue of the storage device as completed I/O requests are removed from the pending queue.

Through the storage device queues discussed above, the file system 206 can externally manage I/O request starvation for a storage device. As mentioned above, storage devices 220 may delay fulfilling some I/O requests for various reasons. This delay or starvation of the I/O request may negatively impact the performance of the storage system 200. Through the queues, the starvation of an I/O request by a storage device 220 may be reduced or otherwise managed by the file system 206 to lessen the negative effect on the storage system 200. In particular, FIG. 4 is a flowchart for a method 400 for externally managing I/O requests for a storage device 220 of a storage system 200 to prevent starvation of I/O requests. The operations of the method 400 may be performed by the file system 206 of the storage system 200, or any other component of the system.

In operation 402, the file system 206 waits for new I/O requests for a storage device 220 of the storage pool 218 or for an indication of a completed I/O request from the storage device. When a new I/O request arrives or an indication of a completed I/O request is received, the file system 206 determines if there are more I/O requests to issue to the storage device 220 in operation 404. If no additional I/O requests are to be issued, the file system returns to operation 402 to wait for new requests. However, if I/O requests are to be issued, the file system 206 determines in operation 406 if the storage device 220 can accept or has capacity for additional I/O requests. If not, the file system 206 returns to operation 402 to wait for an indication of a completed I/O request from the storage device.

If the storage device 220 has capacity as determined in operation 406, the file system may determine whether to delay transmitting a new I/O request to the storage device to force the storage device to service a starved I/O request. For instance, an I/O request sent to the storage device may not be serviced by the storage device in a timely manner. To force the servicing of the delayed I/O request, the file system 206 may be configured to cease transmitting new I/O requests to the storage device until the delayed I/O request is served. In other words, the file system 206 may starve the storage device from new I/O requests until a delayed I/O request is completed. The method through which the file system 206 controls the transmission of I/O requests to the one or more storage devices 220-220N to manage starved I/O requests is performed through the operations of FIG. 4.

To determine when I/O requests sent to a storage device 220 should cease until a starved I/O request is serviced, the file system 206 may, in operation 408, calculate a difference between the oldest I/O request order value in the queue for the storage device and the newest I/O request order value. For example, the file system 206 maintains an I/O request queue for a storage device 200 in the storage pool 218 in a similar manner as described above. Each request in the I/O queue includes an order value indicating the order in which the I/O requests were put into the queue. Thus, the file system 206 calculates the difference between the highest I/O request order value (the I/O request at the tail of the queue) and the lowest remaining I/O request order value (the I/O request at the head of the queue). For example, an I/O queue for a storage device 200 may include a request with ordered value of two (2) at the head and a request with ordered value of 15 at the tail. The calculated difference for this queue would be a value of 13.

In operation 410, the file system may compare the calculated difference for the particular I/O request queue to a threshold value. In one embodiment, the threshold value is a predetermined value that the file system 206 utilizes to detect when one or more I/O requests to a storage device 220 are starved for too long. For example, the file system 206 may receive the threshold value from a system administrator to use in the method 400 of FIG. 4. In other embodiments, the threshold value may vary based on the storage devices used, based on a determined time or date, based on a particular load on the system or particular storage device, and the like such that the value is not predetermined by the file system. In one particular embodiment, the threshold value is the maximum number of concurrent I/O requests that the storage device can accept multiplied by a factor. For example, the threshold value may be 40 as determined by multiplying the maximum number of concurrent I/O requests being handled by the storage device 220 (in this example, 10) by a factor of four. In general, however, the threshold value may be any number as determined or utilized by the file system 206.

In operation 412, the file system 206 determines if the calculated difference of the oldest I/O request and the newest I/O request in the queue is less than or equal to the threshold value based on the comparison. If so, the file system 206 moves to operation 414 and issues the oldest I/O request in the queue that has not already been transmitted to the storage device 220. In other words, the file system 206 determines that the oldest I/O request in the queue has not been starved by the storage device 220 for too long in comparison with the number of pending I/O requests to the storage device such that additional requests to the storage device may occur. However, in some instances, the comparison of the calculated difference in the oldest and newest order values in the queue to the threshold value indicates that an I/O request sent to the storage device 220 has not been serviced or completed for some time. This I/O request may be deemed to be starved by the storage device 220. In response, the file system may cease issuing I/O requests to the storage device 220 until the oldest pending I/O request is serviced by returning to operation 401.

Through the operations explained above, the file system 206 prevents I/O requests from being issued to a storage device until a starved request is filled by the storage device. As such, the file system 206 may monitor the completion of I/O requests and remove those completed requests from the queue when they are completed. Upon completion, the file system 206 may determine if the completed request was the starved I/O request. If not, the method 400 of FIG. 4 may further cease issuing requests to the storage device until the starved I/O request is serviced or completed. Once the starved request is completed, the file system 206 may continue issuing I/O requests to the storage device for completion.

FIGS. 5A-5G are examples of a queue of I/O requests for a storage device to prevent starvation of I/O requests to the storage device. In particular, the illustrated queues provide an example of a file system 206 executing the method 400 of FIG. 4. Thus, although the queues illustrated in FIGS. 5A-5G are for a single storage device 220 (perhaps as part of a storage pool 218), it should be appreciated that the file system 206 may maintain similar queues for multiple storage devices connected or in communication with the file system. The queues illustrated in FIGS. 5A-5G are just one example of an I/O request queue for a storage device in communication with the file system 206. Further, in some embodiments, multiple queues may be maintained for a single storage device in the storage pool. Thus, I/O requests for the storage device may be moved from one queue to another queue for that storage device. For simplicity, however, a single queue is illustrated in FIGS. 5A-5G.

Figure 5A:
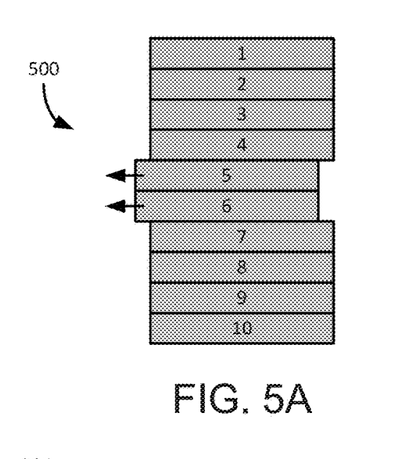
FIGS. 5A-5G are illustrations of a queue of I/O requests for a storage device to prevent starvation of I/O requests to the storage device.

An I/O request queue 500 for managing I/O requests for a storage device 220 is illustrated in FIG. 5A. In particular, the queue includes a list of ten I/O requests received at a file system 206 and intended for a particular storage device. Through the operations mentioned above with reference to FIG. 3, the file system 206 associates an ordered value with each received I/O request for the storage device. In this particular example, the queue 500 includes the first ten I/O requests intended for the storage device which are arranged in the queue accordingly. Further, the gray color of each of the I/O requests in the queue 500 indicates that the requests have been transmitted to the storage device. As mentioned above, many storage devices are limited in the number of concurrent I/O requests the device can process. In this particular example, the storage device may process ten concurrent I/O requests such that each I/O request in the queue 500 is transmitted to the storage device.

As also shown in FIG. 5A, two I/O requests (shown as ordered value requests five and six) may be removed from the queue 500. The requests may be removed from the queue 500 by the file system 206 after the file system receives an indication from the storage device that these particular I/O requests are serviced. Further, as discussed in more detail below, new I/O requests for the storage device may be added to the tail of the queue 500 as they are received at the file system. These new requests include an ordered value that is incremented from the last I/O request in the queue. In this manner, I/O requests for the storage device may be managed by the file system by adding new I/O requests to the tail end of the queue and removing completed I/O requests.

Figure 5B:
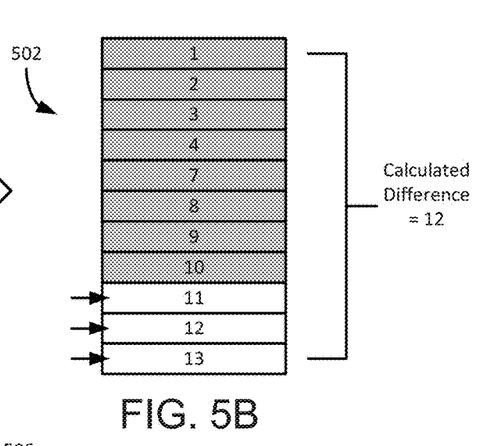

In the queue 502 of FIG. 5B, I/O requests 5 and 6 are removed and new I/O requests ordered 11, 12, and 13 are added to the tail of the queue. Further, because I/O requests 5 and 6 have been completed by the storage device and removed from the queue 502, additional I/O requests may be transmitted to storage device. To determine whether additional I/O requests are sent to the storage device, the file system 206 executes the method 400 of FIG. 4. In other words, the file system 206 determines if the oldest I/O request in the queue is starved so that new requests are not issued to the storage device until the starved I/O request is serviced. In particular, the file system 206 calculates the difference between the oldest I/O request in the queue 502 (in this example, I/O request one) and the newest I/O request in the queue (in this example, I/O request 13). As shown in FIG. 5B, the calculated difference provides a value of 12.

Next, the file system 206 compares the calculated difference to a threshold value. In the examples shown, the threshold value is 12 such that the comparison indicates the calculated difference is equal to the threshold value. Thus, because the calculated difference between the oldest I/O request in the queue and the newest I/O request in the queue is less than or equal to a threshold value, no single I/O request to the storage device is starved and new requests may be transmitted to the storage device. As mentioned above, the threshold value that is utilized by the file system may be any value as determined or received by the file system. Because new I/O requests may be transmitted to the storage device and the storage device has capacity for two additional requests (based on the completion of I/O requests 5 and 6 above), I/O requests 11 and 12 are transmitted to the storage device as shown in the filled-in boxes of FIG. 5C.

Figure 5C:
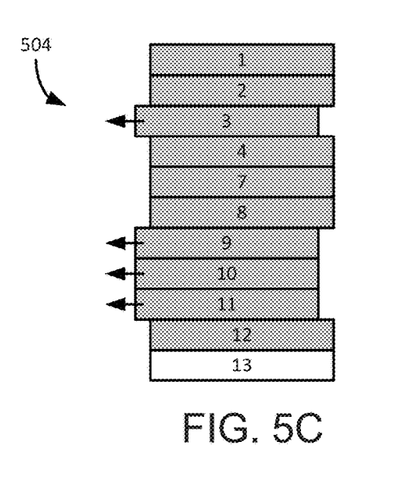
Figure 5D:
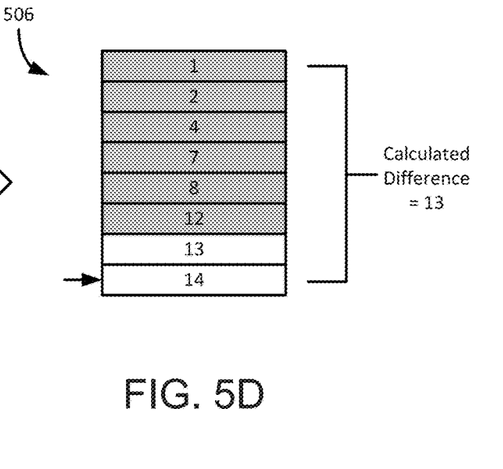

Further assume that I/O requests 3, 9, 10, and 11 are completed by the storage device and removed from the queue 504, as shown in FIG. 5C. Also, in FIG. 5D, a new I/O request is added to the tail of the queue 504, indicated as I/O request 14. Through the completion of requests 3, 9, 10, and 11, the storage device has capacity to receive four additional I/O requests. Thus, in FIG. 5D, the file system 206 again calculates the difference between the oldest I/O request (request one) and the newest I/O request (request 14) in the queue 506. This calculated difference, as shown, is a value of 13. To determine if additional requests should be issued out of the queue 506, this calculated difference is compared to the threshold value of 12. Because the calculated difference is greater than the threshold value, a starved I/O condition is determined for I/O request one in the queue 506. The file system upon, detecting that the oldest request in the queue 506 is starved based on the comparison, may cease issuing new I/O requests to the storage device until the starved I/O request is serviced. Thus, although the storage device has capacity to receive new I/O requests, I/O requests 13 and 14 are delayed in transmission to the storage device until the starved request is serviced.

Figure 5E:
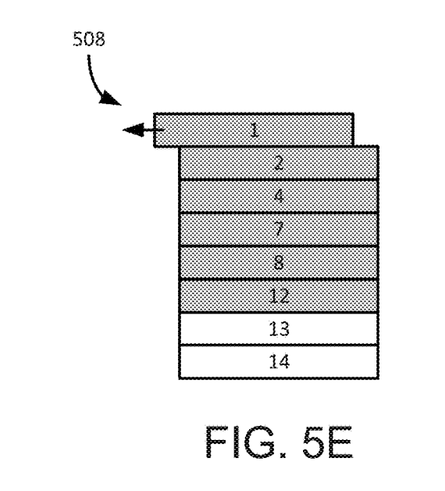

In FIG. 5E, the starved I/O request (I/O request one) is completed by the storage device and removed from the queue 508. In some instances, the file system 206 may cease transmitting I/O requests until the only un-serviced request is the starved request. In other words, the file system may force the storage device to service the starved request by ceasing transmission of any new I/O requests to the storage device until the starved request is serviced. Further, although not shown in the example of FIGS. 5A-5G, the file system 206 may continue to receive new I/O requests for the storage device and add them to the tail of the queue. Such requests are not issued to the storage device, however, until the starved request is serviced. Further, other already transmitted requests (such as I/O request two, four, seven, etc. of queue 508) may be serviced and removed from the queue while the file system is waiting for the starved request to the serviced.

Figure 5F:
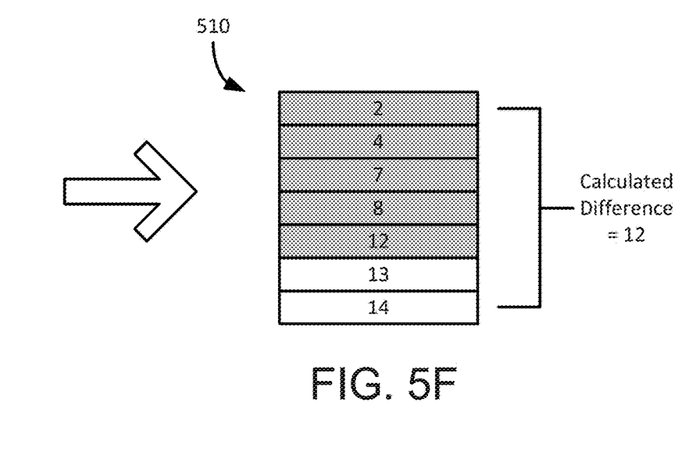
Figure 5G:
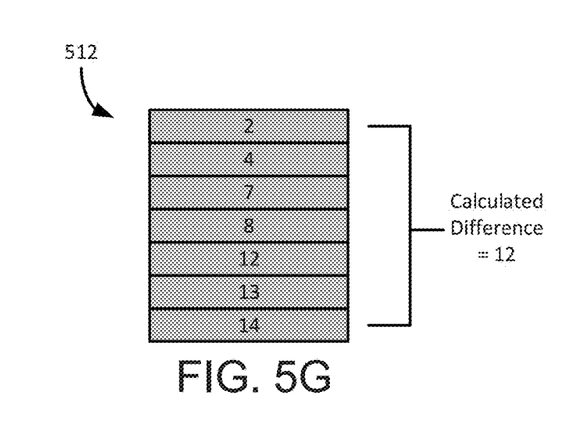

Upon removal of the starved request, the file system 206 again calculates the difference between the oldest request and the newest request, as shown in FIG. 5F. In this example, the calculated difference is equal to or below the threshold value such that new requests may now be transmitted to the storage device. Thus, I/O requests 13 and 14 may then be transmitted to the storage device for service, as illustrated in FIG. 5G. Through the examples and operations described above, the file system may manage the number of I/O requests transmitted to a storage device to externally control the starvation of one or more of the requests to prevent any one request from being starved for too long as determined by the file system. This external control of the requests to the storage device may be more aggressive than the storage device itself and may consider the importance or value of the requests.

Figure 6:
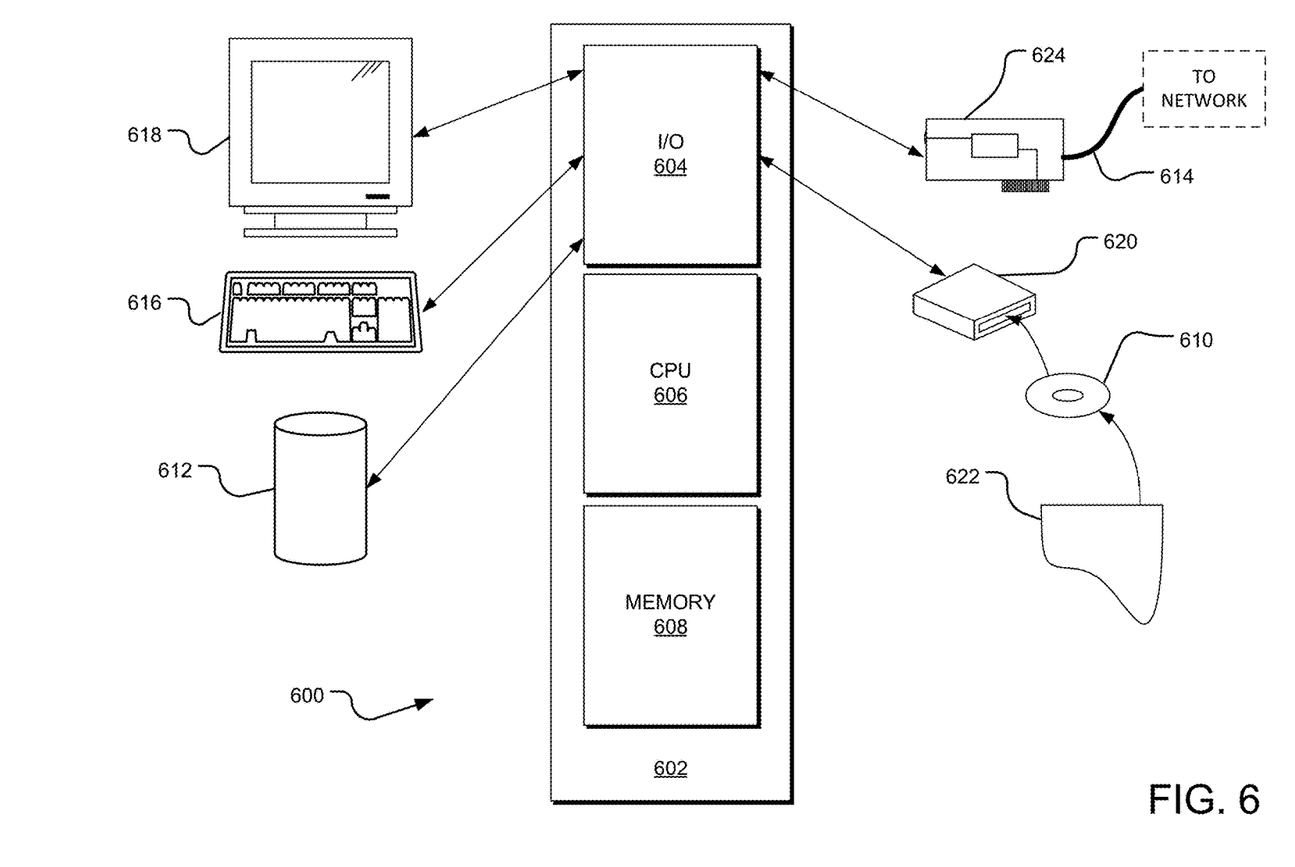
FIG. 6 is an example computing system that may implement various systems and methods of the presently disclosed technology.

Referring now to FIG. 6, a detailed description of an example computing system 600 having one or more computing units that may implement various systems and methods discussed herein is provided. The computing system 600 may be applicable to the storage devices 102-104, the storage system 200, the file system 206, the user devices 112-114, and/or other computing devices. It will be appreciated that specific implementations of these devices may be of differing possible specific computing architectures not all of which are specifically discussed herein but will be understood by those of ordinary skill in the art.

The computer system 600 may be a general computing system is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer, such as one or more external computers made available via a cloud computing architecture. The presently described technology is optionally implemented in software devices loaded in memory 608, stored on a configured DVD/CD-ROM 610 or storage unit 612, and/or communicated via a wired or wireless network link 614, thereby transforming the computer system 600 in FIG. 6 to a special purpose machine for implementing the described operations.

The I/O section 604 is connected to one or more user-interface devices (e.g., a keyboard 616 and a display unit 618), a disc storage unit 612, and a disc drive unit 620. In the case of a tablet or smart phone device, there may not be a physical keyboard but rather a touch screen with a computer generated touch screen keyboard. Generally, the disc drive unit 620 is a DVD/CD-ROM drive unit capable of reading the DVD/CD-ROM medium 610, which typically contains programs and data 622. Computer program products containing mechanisms to effectuate the systems and methods in accordance with the presently described technology may reside in the memory section 604, on a disc storage unit 612, on the DVD/CD-ROM medium 610 of the computer system 600, or on external storage devices made available via a cloud computing architecture with such computer program products, including one or more database management products, web server products, application server products, and/or other additional software components. Alternatively, a disc drive unit 620 may be replaced or supplemented by an optical drive unit, a flash drive unit, magnetic drive unit, or other storage medium drive unit. Similarly, the disc drive unit 620 may be replaced or supplemented with random access memory (RAM), magnetic memory, optical memory, and/or various other possible forms of semiconductor based memories commonly found in smart phones and tablets.

The network adapter 624 is capable of connecting the computer system 600 to a network via the network link 614, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system or portions thereof, may be stored in a remote memory storage device. It is appreciated that the network connections shown are examples of communications devices for and other means of establishing a communications link between the computers may be used.

Some or all of the operations described herein may be performed by the processor 602. Further, local computing systems, remote data sources and/or services, and other associated logic represent firmware, hardware, and/or software configured to control operations of the storage device maintenance, the storage devices 102-104, the user devices 112-114, and/or other computing units or components of the storage system 100. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 602 and a user may interact with a GUI using one or more user-interface devices (e.g., the keyboard 616, the display unit 618, and the user devices 112-114) with some of the data in use directly coming from online sources and data stores. The system set forth in FIG. 6 is but one possible example of a computer system that may employ or be configured in accordance with aspects of the present disclosure.

It should be noted that the flowcharts of FIGS. 3 and 4 are illustrative only. Alternative embodiments of the present invention may add operations, omit operations, or change the order of operations without affecting the spirit and scope of the present invention. The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for managing a storage pool comprising:
   maintaining a queue of one or more input/output requests intended for a storage device, wherein each input/output request comprises a position value indicative of an order in which that input/output request was received at a storage management system, wherein the storage device is configured to satisfy up to a particular quantity of concurrent input/output requests;
   calculating a difference between a first position value corresponding to a position of a first input/output request within the queue of one or more input/output requests and a second position value corresponding to a position of a second input/output request in the queue of one or more input/output requests;
   determining that the difference between the first position value and the second position value exceeds a threshold value, the threshold value being greater than the particular quantity of concurrent input/output requests;
   preventing input/output requests from being transmitted from the queue of one or more input/output requests to the storage device in response to determining that the difference between the first position value and the second position value exceeds the threshold value;
   determining that processing of an input/output request has been completed by the storage device;
   removing the input/output request from the queue of one or more input/output requests in response to determining that processing of the input/output request has been completed by the storage device;
   calculating an updated difference between a first position value corresponding to a position of a new first input/output request within the queue of one or more input/output requests and a second position value corresponding to a position of a new second input/output request in the queue of one or more input/output requests;
   determining that the difference between the first position value and the second position value is less than or equal to the threshold value; and
   transmitting at least one input/output request from the queue of one or more input/output requests to the storage device when the updated difference between the first position value and the second position value is less than or equal to the threshold value.

2. The method of claim 1, wherein the first input/output request in the queue of one or more input/output requests is located at a head of the queue of one or more input/output requests and the second input/output request is located at a tail of the queue of one or more input/output requests.

3. The method of claim 1, further comprising:
   receiving a new input/output request for the storage device;
   associating a new position value to the new input/output request for the storage device; and
   adding the new input/output request and the new position value to a tail of the queue of one or more input/output requests.

4. The method of claim 1, further comprising:
   receiving a completion indicator from the storage device; and
   removing a corresponding input/output request from the queue of one or more input/output requests.

5. The method of claim 1 wherein the storage device is a portion of a pool of storage devices in communication with the storage management system.

6. The method of claim 5, further comprising:
   maintaining a second queue of one or more input/output requests intended for a second storage device of the pool of storage devices, wherein each of the input/output requests of the second queue of one or more input/output requests comprise a position value indicative of the position in which the input/output requests were received at the storage management system for the second storage device.

7. The method of claim 1, wherein transmitting the at least one input/output request from the queue of one or more input/output requests occurs upon receiving an indication from the storage device of a capacity to service the at least one input/output request.

8. The method of claim 1, wherein the threshold value equals the particular quantity of concurrent input/output requests multiplied by a factor.

9. The method of claim 1 wherein the storage management system comprises a file system for a large scale storage appliance.

10. One or more non-transitory tangible computer-readable storage media storing computer-executable instructions for performing a computer process on a machine, the computer process comprising:
   maintaining a queue of one or more input/output requests intended for a storage device, wherein each input/output request comprises a position value indicative of an order in which that input/output request was received at a storage management system, wherein the storage device is configured to satisfy up to a particular quantity of concurrent input/output requests;
   calculating a difference between a first position value corresponding to a position of a first input/output request within the queue of one or more input/output requests and a second position value corresponding to a position of a second input/output request in the queue of one or more input/output requests, wherein the first input/output request was received at the storage management system before the second input/output request;
   determining that the difference between the first position value and the second position value exceeds a threshold value, the threshold value being greater than the particular quantity of concurrent input/output requests;
   preventing input/output requests from being transmitted from the queue of one or more input/output requests to the storage device in response to determining that the difference between the first position value and the second position value exceeds the threshold value;

determining that processing of an input/output request has been completed by the storage device;

removing the input/output request from the queue of one or more input/output requests in response to determining that processing of the input/output request has been completed by the storage device;

calculating an updated difference between a first position value corresponding to a position of a new first input/output request within the queue of one or more input/output requests and a second position value corresponding to a position of a new second input/output request in the queue of one or more input/output requests;

determining that the difference between the first position value and the second position value is less than or equal to the threshold value; and transmitting at least one input/output request from the queue of one or more input/output requests of the one or more input/output requests to the storage device when the updated difference between the first position value and the second position value is less than or equal to the threshold value.

11. The one or more non-transitory tangible computer-readable storage media of claim 10, wherein the first input/output request in the queue of one or more input/output requests is located at a head of the queue of one or more input/output requests and the second input/output request is located at a tail of the queue of one or more input/output requests.

12. The one or more non-transitory tangible computer-readable storage media of claim 10, wherein the computer process further comprises:

receiving a new input/output request for the storage device;

associating a new position value to the new input/output request for the storage device; and adding the new input/output request and the new position value to a tail of the queue of one or more input/output requests.

13. The one or more non-transitory tangible computer-readable storage media of claim 10, wherein the computer process further comprises:

receiving a completion indicator from the storage device; and removing a corresponding input/output request from the queue of one or more input/output requests.

14. The one or more non-transitory tangible computer-readable storage media of claim 10 wherein the storage device is a portion of a pool of storage devices in communication with the storage management system.

15. The one or more non-transitory tangible computer-readable storage media of claim 14, wherein the computer process further comprises:

maintaining a second queue of one or more input/output requests intended for a second storage device of the pool of storage devices, wherein each of the input/output requests of the second queue of one or more input/output requests comprise a position value indicative of a position in which the input/output requests were received at the storage management system for the second storage device.

16. The one or more non-transitory tangible computer-readable storage media of claim 10, wherein transmitting the at least one input/output request from the queue of one or more input/output requests occurs upon receiving an indication from the storage device of a capacity to service the at least one input/output request.

17. The one or more non-transitory tangible computer-readable storage media of claim 10, wherein the threshold value equals the particular quantity of concurrent input/output requests multiplied by a factor.

18. The one or more non-transitory tangible computer-readable storage media of claim 10 wherein the storage management system comprises a file system for a large scale storage appliance.

* * * * *

UNITED STATES PATENT AND TRADEMARK OFFICE
CERTIFICATE OF CORRECTION

PATENT NO. : 10,241,685 B2
APPLICATION NO. : 15/239396
DATED : March 26, 2019
INVENTOR(S) : Sanouillet et al.

Page 1 of 1

It is certified that error appears in the above-identified patent and that said Letters Patent is hereby corrected as shown below:

In the Drawings

On sheet 4 of 7, in FIG. 4, under Reference Numeral 408, Line 2, delete "valueYrequest" and insert -- value request --, therefor.

In the Specification

In Column 1, Line 61, delete "the a" and insert -- the --, therefor.

In Column 2, Line 4, delete "value" and insert -- value. --, therefor.

In Column 2, Line 15, delete "the a" and insert -- the --, therefor.

Signed and Sealed this
Third Day of November, 2020

Andrei Iancu
*Director of the United States Patent and Trademark Office*